US012798348B2

(12) United States Patent
Ziskovsky et al.

(10) Patent No.: US 12,798,348 B2
(45) Date of Patent: Nov. 17, 2026

(54) ELECTRIC AXLE WITH MOTOR POWER UNIT

(71) Applicant: Dana Heavy Vehicle Systems Group, LLC, Maumee, OH (US)

(72) Inventors: Darren J. Ziskovsky, Bowling Green, OH (US); William F. Waltz, Toledo, OH (US); David Loki, Maumee, OH (US); Wayne Petzke, Pinckney, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 205 days.

(21) Appl. No.: 18/921,778

(22) Filed: Oct. 21, 2024

(65) Prior Publication Data

US 2026/0109213 A1 Apr. 23, 2026

(51) Int. Cl.
*B60K 1/00* (2006.01)
*F16H 57/04* (2010.01)

(52) U.S. Cl.
CPC ........... *B60K 1/00* (2013.01); *F16H 57/0476* (2013.01); *B60K 2001/006* (2013.01)

(58) Field of Classification Search
CPC ....... F16H 57/0476; B60K 1/00; B60K 11/02; B60K 2001/001; B60K 2001/006; B60K 17/00; B60K 5/00; B60K 3/00; B60K 6/00; B60K 11/00
See application file for complete search history.

(56) References Cited

U.S. PATENT DOCUMENTS

2012/0286607 A1* 11/2012 Shimizu .............. F16H 57/0471 310/90
2022/0324333 A1* 10/2022 David ...................... B60K 1/00
2026/0012056 A1* 1/2026 Blank .................... H02K 5/203

FOREIGN PATENT DOCUMENTS

DE 102022001354 B3 9/2023
DE 102022117537 A1 1/2024

* cited by examiner

*Primary Examiner* — Naishadh N Desai
(74) *Attorney, Agent, or Firm* — McCoy Russell LLP

(57) ABSTRACT

A motor power unit is provided. The motor power unit includes, in one example, a traction motor that includes an output shaft and a motor face circumferentially surrounding the output shaft. The motor power unit further includes a heat exchanger in fluidic communication with a cooling system that is configured to circulate coolant through a hydraulic manifold and a housing at least partially enclosing the traction motor and the heat exchanger. In the motor power unit, the housing includes a body with multiple mounting support tabs, the multiple mounting support tabs each include a hole with a central axis that is parallel to the rotational axis of the output shaft, and the motor face is configured to pilot to a gearbox housing in a gearbox via a pilot component.

20 Claims, 15 Drawing Sheets

ELECTRIC AXLE WITH MOTOR POWER UNIT

TECHNICAL FIELD

The present description relates generally to a motor power unit for an electric axle. Specifically, the motor power unit functions as a self-contained functional power system that is capable of being assembled independent from a gearbox.

BACKGROUND AND SUMMARY

Electric axles are increasingly being used in electric vehicle platforms as the transportation market trends towards powertrain electrification. Certain electric axles have integrated the traction motor into a gearbox in an attempt to increase the space efficiency of the axle and reduce leak paths with regard to cooling and lubrication fluids. The gearbox housing may be large, heavy, and bulky and integration of the motor into the gearbox may complicate electric axle manufacturing, assembly, and repair. To elaborate, electric axle manufacturing can exhibit complexity due to the need to assemble the motor into the gearbox housing. Functionality of the motor may be unknown at this point in manufacturing. Further axle assembly is complex because multiple parallel shafts may need to be installed and a side cover may be attached while aligning multiple shafts and bearings. In many cases, motor functionality testing occurs after the electric axle is fully assembled, at which point quantifying certain motor parameters may be difficult due to gear drag and bearing preloads. If motor issues are discovered during testing, disassembly of the entire electric axle may be needed to service the motor.

The inventors have recognized the abovementioned challenges with previous electric axles and developed a motor power unit to address at least a portion of the challenges. The motor power unit, in one example, includes a traction motor that includes an output shaft and a motor face that circumferentially surrounds the output shaft. The motor power unit further includes a heat exchanger that is in fluidic communication with a cooling system that is configured to circulate coolant through a hydraulic manifold. The motor power unit further includes a housing at least partially enclosing the traction motor and the heat exchanger. In the motor power unit, the housing includes a body with multiple mounting support tabs and the multiple mounting support tabs each include a hole with a central axis that is parallel to the rotational axis of the output shaft. Further, in the motor power unit, the motor face is configured to pilot to a gearbox housing in a gearbox via a pilot component (e.g., a pilot bore and/or one or more dowel pins). In this way, the motor power unit is able to be fully assembled with its supporting components as a complete functioning system that is capable of testing prior to attaching the motor power unit to the gearbox. To elaborate, the motor power unit and the gearbox may be independently assembled and pre-checked (e.g., in parallel), to increase manufacturing efficiency and provide scheduling flexibility, if desired. Further, the motor power unit is able to be efficiently reworked before final shipment (if desired), as the electric axle is able to be easily separated into its two main components (i.e., the motor power unit and the gearbox). Further, the motor power unit with the abovementioned features allows the unit to be easily repaired in the field, if needed. Further, this motor power unit arrangement allows the motor power unit to be translated along the traction motor's central axis when attaching the motor power unit to the gearbox. As the traction motor's pilot component slides into place, the mounting support tabs are also able to be precisely aligned and snugged up in an efficient manner, if desired.

In one example, the motor power unit housing includes a sump return port that is configured to fluidly attach to a gearbox sump in the gearbox. The motor power unit housing further includes a flat surface that is arranged adjacent to a flat surface in the gearbox housing when the gearbox is attached to the motor power unit. In this way, the motor power unit's sump can be efficiently connected to a gearbox sump.

The sump return port may be attached to the gearbox using different techniques. In a first example, a seal is positioned between the flat surface in the motor power unit and the flat surface in the gearbox housing when the gearbox is attached to the motor power unit. In such an example, the flat surfaces may be profiled to allow the motor power unit to be rotated into mating engagement subsequent to attachment of the traction motor's output shaft to an input shaft of the gearbox. In this way, the electric axle is able to be more efficiently assembled.

In a second alternate example, a flanged sleeve may be coupled to the sump return port and configured to fluidly couple to the gearbox sump. In such an example, a flange in the flanged sleeve may be configured to removably attach to the gearbox housing, or the motor power unit housing. A face seal may be included in the flange sleeve near the flange. The face seal is able to float to absorb positional tolerances in the plane of the adjacent flat surfaces. In this way, the electric axle is able to more effectively manage tolerance stack-up.

In a third alternate example, a stepped sleeve is mated with the gearbox sump return port and adjacent to the flat surface in the motor power unit. The stepped sleeve allows positional tolerance normal to the adjacent flat surfaces, and radial relief to create sleeve misalignment that absorbs positional tolerances in the plane of the adjacent flat surfaces. Further, the stepped sleeve may be designed with axial float but retained within the housing of the motor power unit via a screw and/or bracket. The stepped sleeve may be installed through a heat exchanger opening in the motor power unit's housing. In this way, the motor power unit housing is designed for efficient installation of the stepped sleeve. However, other suitable installation procedures for the stepped sleeve may be used, in other examples.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to an electric axle with a semi-integrated motor power unit (MPU) that allows the electric axle to achieve simplified assembly and cost reductions with regard to assembly, testing, freight, axle rework, etc. To elaborate, the MPU is designed to be tested autonomously from the remainder of the electric axle, prior to attaching the MPU to a gearbox. Specifically, the MPU is a standalone, self-contained functional power system, independent of the gearbox. The MPU can be fully assembled with its supporting components as a complete functioning system, tested and certified, before being shipped. The physical size of the MPU may be a fraction of the overall gearbox, and allows it to be more readily assembled and tested at existing motor assembly workstations.

Additionally, the semi-integrated MPU allows the MPU to be attached to the gearbox after gearbox assembly which has several benefits. Firstly, the semi-integrated MPU design allows the gearbox to be fully assembled and pre-checked before a MPU is attached to the gearbox. Additionally, the semi-integrated MPU design allows easier rework before final shipment, as the electric axle may be separated. Further, the semi-integrated MPU design allows for easier field repair due to the fact that the axle is able to be easily separated. Further, the semi-integrated MPU design allows for different MPUs with other traction motor ratings to be attached to the gearbox, thus expanding the gearbox's versatility over a broader range of applications.

The MPUs described herein may include an electric motor and one or more of the following components: an MPU housing, a motor output shaft, an oil return component, an oil pump, a water/glycol pump, a scavenger pump, a heat exchanger, a filter, a hydraulic manifold, valving, sensors (e.g., rotary encoders, position sensors, pressure sensors, temperature sensors, flow rate sensors, electrical conductivity sensors, contamination sensors, etc.), an oil reservoir, a drain plug, a magnet, motor and gearbox oil cooling circuitry, motor and gearbox oil lubrication circuitry, electrical connectors, a fully integrated or semi-integrated inverter, a fully or semi-integrated transmission control unit (TCU), DC power cable connections, higher voltage cable connections, hydraulic ports, vent caps, gaskets, seals, hydraulic fittings, access panels, pilot bores/alignment dowels, attachment screws, and an integrated rock deflector and wiring harness.

Figure 1:
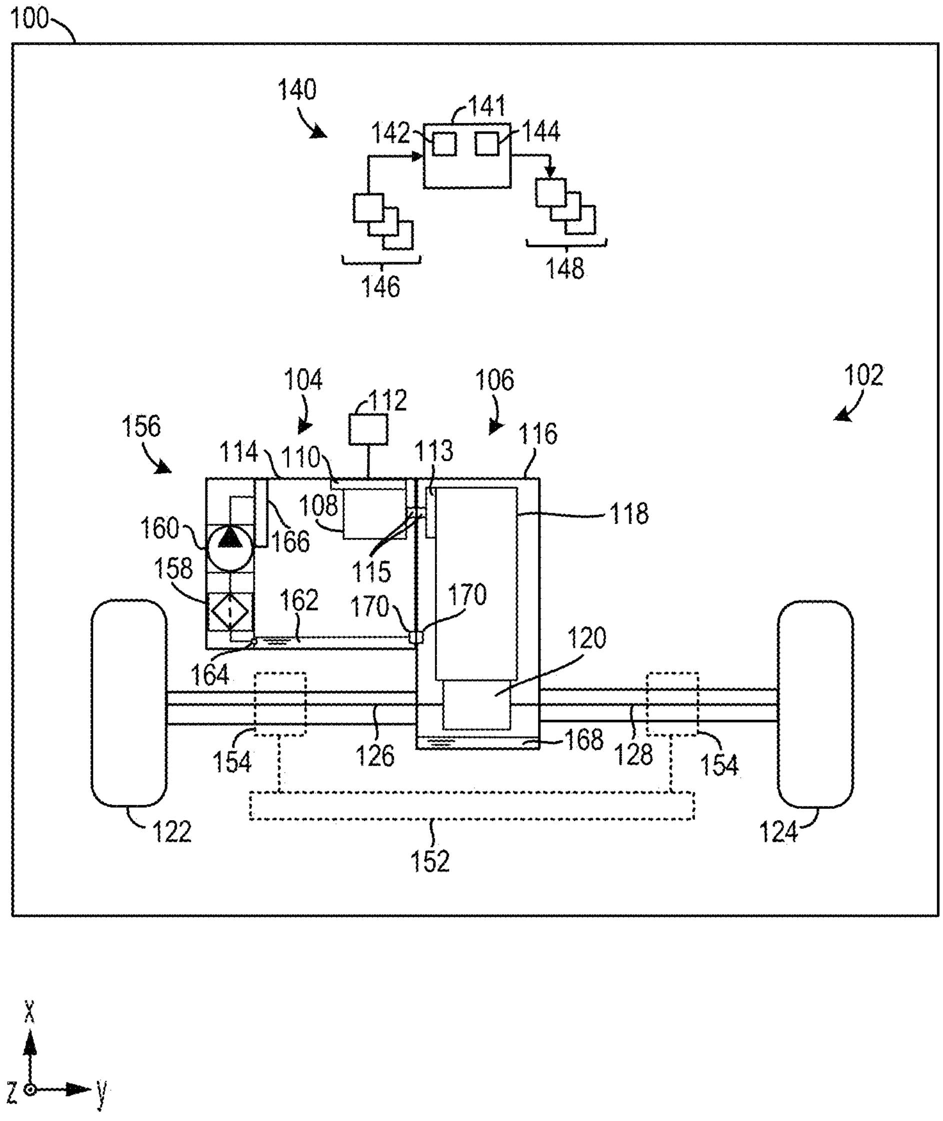
FIG. 1 shows a schematic representation of an electric vehicle with an electric axle that includes a motor power unit and a gearbox.

FIG. 1 schematically illustrates an electric vehicle (EV) 100 with an electric axle 102. The EV 100 may take a variety of forms in different examples, such as a light, medium, or heavy duty vehicle. Additionally, the electric axle 102 may be adapted for use in front and/or rear axles, as well as steerable and non-steerable axles.

To generate motive power, an MPU 104 is provided in the electric axle 102. The MPU 104 is rotationally coupled to a gearbox 106. Further, in other examples, the EV 100 may include an additional motive power source, such as an internal combustion engine (ICE) (e.g., a spark and/or compression ignition engine), for providing power to another axle and/or recharging an energy storage device. As such, the EV may be a hybrid electric vehicle (HEV) or an all-electric vehicle, in another example.

The MPU 104 and the gearbox 106 are schematically depicted in FIG. 1. However, it will be appreciated that both the MPU 104 and the gearbox 106 have greater structural complexity that is expanded upon herein with regard to FIGS. 2-18.

The MPU 104 includes a traction motor 108. The traction motor 108 may be specifically configured as a motor-generator, in one example. As such, the traction motor 108 may include a stator and a rotor that function to generate mechanical power, in a drive mode as well as generate electric power during a regenerative mode. Further, an inverter 110 electrically coupled to the traction motor 108 may be incorporated into the MPU 104. The inverter 110 may be electrically coupled to an energy storage device 112 (e.g., one or more traction batteries, capacitors, and the like). The traction motor 108 is coupled to a gear 113 or other suitable component in the gearbox 106 via shafts 115 and/or other suitable mechanical components.

A housing 114 of the MPU 104 and a housing 116 of the gearbox 106 may be coupled to one another using mounting support tabs that are expanded upon herein. The housing 114 may be referred to as a housing or a MPU housing, more specifically. Additionally, the housing 116 may be referred to as a gearbox housing or a gearbox housing, more specifically. Similar housing nomenclature may be used for the other electric axles described herein. The gearbox 106 may include a gear set 118 (e.g., spur, helical, planetary gears, or combinations thereof) that is rotationally coupled to a differential 120 such that mechanical power is able to flow therebetween. Therefore, the gearbox 106 may be a single-speed gearbox, where the gearbox 106 operates in one gear ratio or a multi-speed gearbox that is designed to operate in multiple distinct gear ratios.

From the differential 120, mechanical power may be transferred to drive wheels 122 and 124 by way of axle shafts 126 and 128, respectively. In some examples, the differential 120 may be an open differential, a locking differential, an active or passive limited slip differential, or a torque vectoring differential.

In some embodiments, the EV 100 may include additional components, systems, etc. which are coupled to, mounted on, or otherwise joined thereto. For example, a suspension system 152 (e.g., a dependent suspension system) may be coupled to the electric axle 102 via mounting interfaces 154. In the dependent suspension system example, the electric axle may be a beam axle. In other applications the electric axle may have an independent suspension system with half shafts replacing axle shafts 126 and 128.

Figure 2:
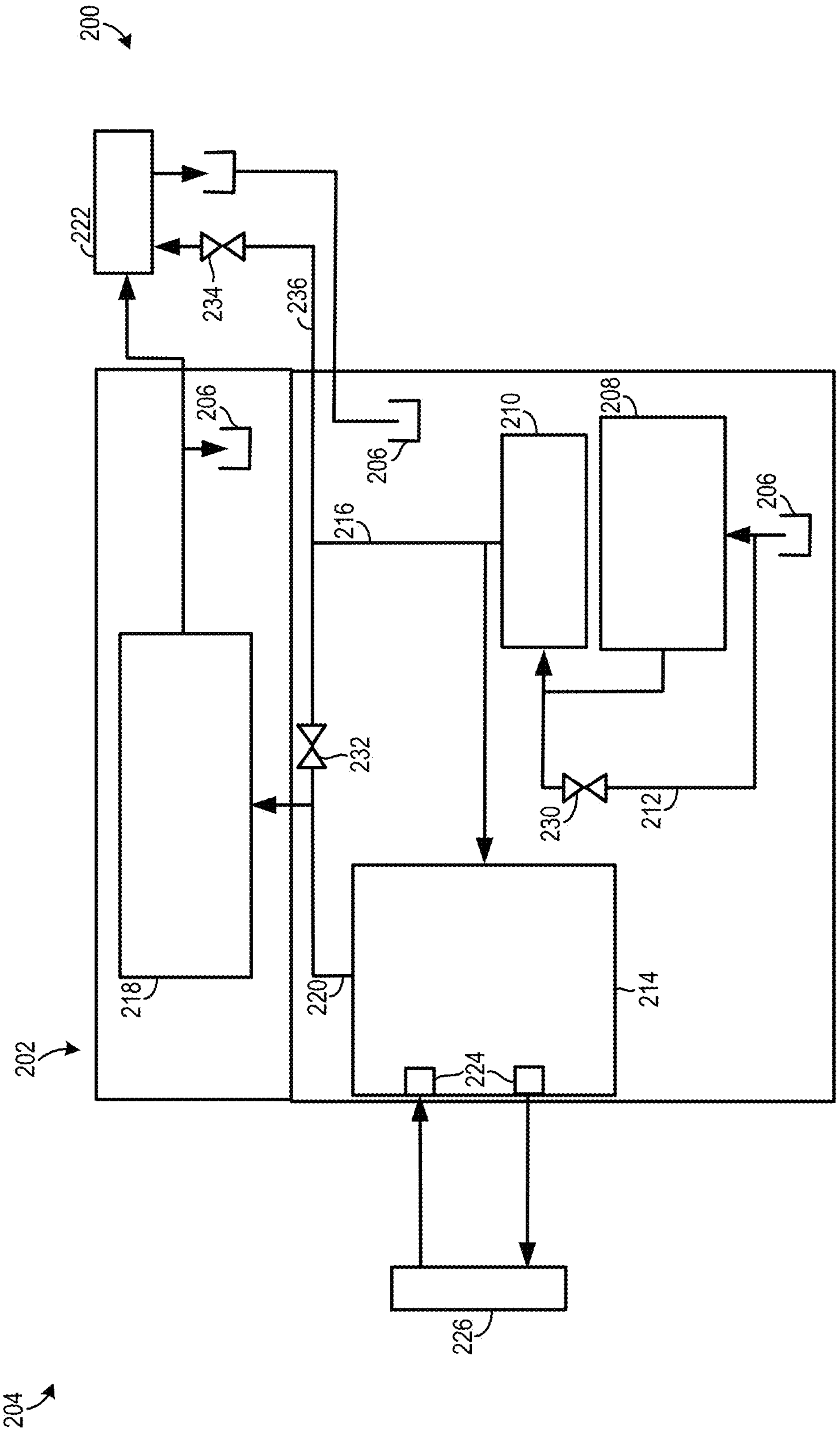
FIG. 2 shows a schematic representation of a cooling system for an electric axle.

The electric axle 102 may further include a cooling system 156. Specifically, a standalone portion of the cooling system 156 may be incorporated into the MPU 104. Generally, the cooling system 156 may include a filter 158 in fluidic communication with an oil pump 160 and a MPU sump 162 via a filter pick-up 164. The oil pump 160 is in fluidic communication with a hydraulic manifold 166 that is internally arranged within the MPU housing 114. The architecture of an exemplary cooling system is shown in FIG. 2 and discussed in greater detail herein.

The MPU sump 162 is in fluidic communication with a gearbox sump 168 via one or more sump return ports 170 in both the MPU 104 and the gearbox 106. The MPU 104 may further include a water/glycol pump, a scavenge/transfer pump, valves, and the like.

The EV 100 may also include a control system 140 with a controller 141. The controller 141 may include a processor 142 and a memory 144. The memory may hold instructions stored therein that when executed by the processor cause the controller 141 to perform various methods, control techniques, and the like. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the EV 100 and electric axle 102. The controller 141 may also send control signals to various actuators 148 coupled at different locations in the EV 100 and electric axle 102. For instance, the controller 141 may send command signals to the oil pump 160 and, in response, the speed of the pump may be adjusted to alter the flowrate of the oil delivered therefrom. It will be understood that the controllable components in the electric axles described herein may include actuators. In other examples, the controller may receive a change in throttle position command as requested by the operator via a change in foot position on the throttle pedal. The controller may send control signals to the inverter 110, and in response to receiving the command signals, the electric machine may be adjusted to alter a rotor speed or torque. The other controllable components in the system may be operated in a similar manner with regard to sensor signals and actuator adjustment.

An axis system is provided in FIG. 1 as well as FIGS. 3-5, 7A-9, 11-12, 14, and 17-18, when appropriate, for reference. The z-axis may be a vertical axis (e.g., parallel to a gravitational axis), the x-axis may be a longitudinal axis (e.g., horizontal axis), and/or the y-axis may be a lateral axis, in one example. However, the axes may have other orientations, in other examples.

FIG. 2 shows an illustration of an exemplary cooling system 200 in an MPU 202 and an electric axle 204, more generally. It will be appreciated that the cooling system 200 serves as an example of the cooling system 156 depicted in FIG. 1, and may be included in any of the MPUs and electric axles described herein or combinations thereof.

The cooling system 200 includes a MPU sump 206. An oil filter 208 is in fluidic communication with the MPU sump 206. Further, an oil pump 210 is in fluidic communication with the MPU sump 206 via an optional bypass line 212 with a bypass valve 230 and the oil filter 208 in the illustrated example. Further, the oil pump 210 is in fluidic communication with an oil cooler 214.

An optional cooler bypass 216 with a bypass valve 232 may route oil from the oil pump 210 to the traction motor 218. The oil cooler 214 circulates oil therethrough as well as a coolant (e.g., a mixture of water and/or ethylene glycol) to remove heat from the oil. In other examples, the oil cooler 214 may additionally or alternatively include air cooled heat sinks. From the oil cooler 214, oil is routed to the traction motor 218 as indicated via arrow 220 for cooling and lubrication. From the traction motor 218, oil may be routed to a gearbox 222 for lubrication and cooling and the MPU sump 206. Pressurized oil may further be routed to the gearbox 222 via arrow 236 with valve 234. Coolant ports 224 in the oil cooler 214 (through which a mixture of water and/or ethylene glycol) may be in fluidic communication with a radiator 226 which may be included in a vehicle cooling system.

Figure 3:
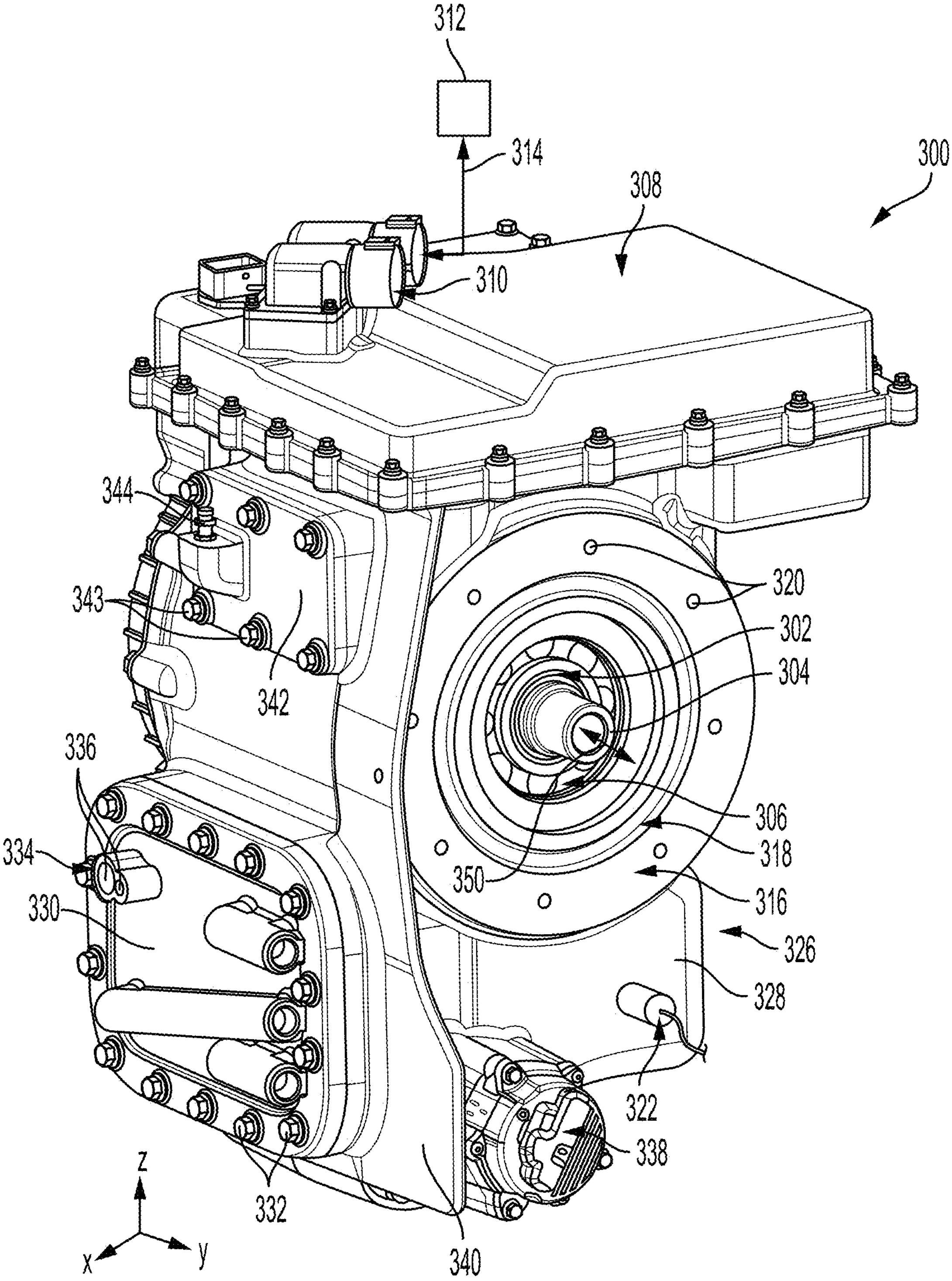
FIGS. 3-4 show different views of an example of a motor power unit.

FIG. 3 shows an example of a MPU 300 that includes a traction motor 302 with an output shaft 304. The features from the MPUs shown in FIGS. 1-2 may be included in the MPU 300 as well as the other MPUs and electric axles, more generally, described herein or vice versa.

A bearing 306 in the traction motor 302 is further shown in the exemplary MPU 300, depicted in FIG. 3. The MPU 300 further includes an inverter 308 that is arranged above the traction motor 302 in the illustrated example. Positioning the inverter 308 above the traction motor 302 allows the MPU to be easily attached to the gearbox in a space efficient manner, although other placement orientations have been considered. The inverter 308 includes an electrical interface 310 (e.g., DC power cable connection) that is electrically connected to an energy storage device 312 as denoted via arrows 314 when the MPU is installed in an EV powertrain.

The traction motor 302 includes a motor face 316 that circumferentially surrounds the output shaft 304, in the illustrated example. The motor face 316 is configured to pilot to a gearbox housing in a gearbox via a pilot component 318. The pilot component 318 takes the form a pilot bore, in the illustrated example. Additionally or alternatively, one or more alignment dowel pins may be used as the pilot component. The motor face 316 includes openings 320 that allow attachment devices (screws, bolts, and the like) to attach the motor face to a gearbox housing.

A temperature sensor 322, and/or additional sensors, may further be included in the MPU 300. The MPU 300 includes a housing 326 with a body 328 that has sections removably coupled thereto to provide access to internal componentry.

An access panel 330 provides access to a heat exchanger. The access panel 330 is removably coupled to the body 328 via attachment devices 332 (e.g., bolts, screws, combinations thereof, and the like). A hydraulic fitting 334 with coolant ports 336 may be coupled to or otherwise incorporated in the access panel 330. The hydraulic fitting 334 is in fluidic communication with a heat exchanger that is internally positioned within the MPU 300 to protect the heat exchanger from degradation from road debris, for instance. The hydraulic fitting 334 may be in fluidic communication with a radiator, as discussed above.

An oil pump 338 is coupled to the housing body 328 in the illustrated example. The oil pump 338 receives oil from an oil sump in the housing body 328 and delivers oil to the internal oil cooler and the traction motor 302.

A road debris deflector 340 may be provided in the body 328 of the housing 326 to reduce the likelihood of road debris hitting the oil pump 338 and specifically the pump's wiring and degrading operation of the oil pump.

Another access panel 342 removably coupled to the housing body 328 via attachment device 343 may provide additional access to internal componentry within the housing for terminating the stator windings as an example. The access panel 342 includes a vent cap 344 that is designed to purge air from the housing's internal enclosure.

Figure 4:
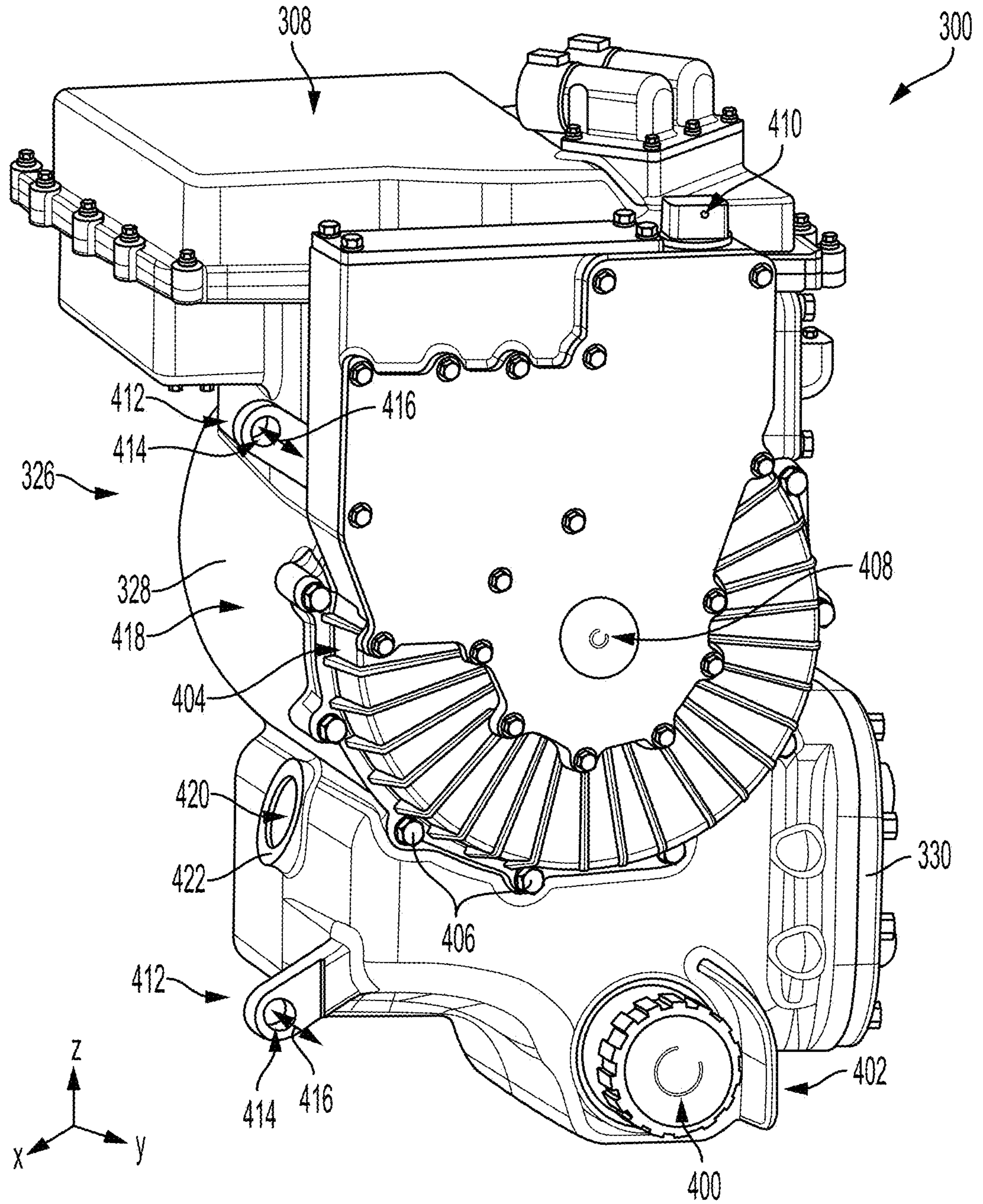

FIG. 4 shows another view of the MPU 300. The inverter 308 and the housing 326 with the body 328 and the access panel 330 are again illustrated. An oil filter 400 is coupled to the housing body 328. Another deflector 402 that is included in the housing body 328 is depicted in the illustrated example. The deflector 402 reduces the chance of road debris striking or otherwise degrading the oil filter 400.

Another access panel 404 is removably coupled to the housing body 328 via attachment devices 406, in the illustrated example. The access panel 404 functions as a rear motor cover and thereby provides access to the traction motor. A rotary encoder 408 may be incorporated into the access panel 404. An electrical connector 410 for the traction motor is provided in the access panel 404, in the illustrated embodiment.

The housing 326 includes mounting support tabs 412 incorporated therein. However, in other examples, the support tabs may be welded or screwed to the housing. The mounting support tabs 412 include holes 414 for mounting the MPU 300 to a gearbox which is discussed in greater detail herein.

The mounting support tabs 412 are positioned axially offset (e.g., rearwardly axially offset) from the motor face 316, shown in FIG. 3, to support the overhung MPU mass when coupled to the gearbox.

The mounting support tabs 412 are profiled to align with mating holes (e.g., tabs) in a housing of the gearbox for alignment of dowel pins (e.g., hollow dowel pins), translational guide pins, and/or screws.

The axes of the dowel pins, translational guide pins, and/or screws that attach the MPU 300 to a gearbox may be parallel and offset to the motor shaft axis 350 such that the motor face 316, the pilot bore 318, and the attachment device openings 320, shown in FIG. 3 may be constructed (e.g., machined) using one manufacturing set-up to reduce tolerance stack-up and increase manufacturing efficiency. Put another way, central axes 416 of the holes 414 are parallel to a rotational axis 350 of the traction motor (shown in FIG. 3). This arrangement allows assembly of the motor to be translational with the axis of the traction motor. As the motor pilot/dowels slides into place, the mounting support tabs 414 may also be aligned and snugged up. In this way, the electric axle may be more efficiently assembled.

The housing body 328 specifically includes two mounting support tabs 414 in the illustrated example. However, the housing body 328 may include additional support tabs that may be incorporated into a region 418 below the inverter 308. The mounting support tabs 414 are arranged rearward of the sump return port 420 and the region 418 of the housing body 328 to increase (e.g., maximize) support and rigidity while facilitating MPU assembly to the gearbox.

A sump return port 420 is incorporated into the housing body 328, in the illustrated example. The sump return port 420 is in fluidic communication with the MPU oil sump in the illustrated example. A flat surface 422 surrounds the sump return port 420. The flat surface 422 allows the MPU housing 326 to be aligned in desired manner with the gearbox housing. Alignment of the MPU and the gearbox is described in greater detail herein with regard to FIGS. 5-7B. Further, the sump return port 420 is positioned vertically below the traction motor, in the illustrated example, to enable efficient oil routing between the MPU and the gearbox. FIG. 4 shows one sump return port 420, but other MPUs with multiple sump return ports have been considered as well.

Figure 5:
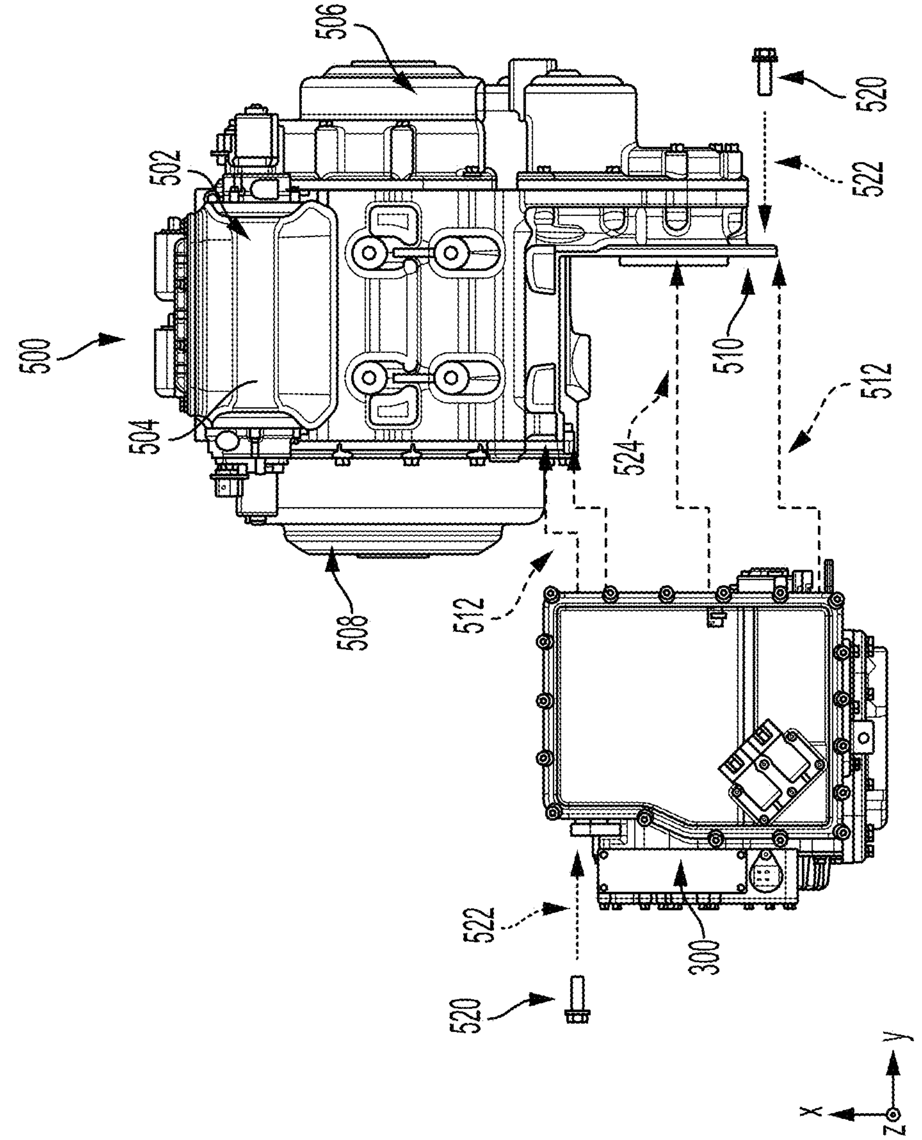
FIGS. 5-6 show a sequence for attaching the motor power unit, depicted in FIGS. 3-4, to a gearbox.

FIG. 5 shows a technique for aligning and attaching the MPU 300 to a gearbox 500. The gearbox 500 specifically includes a housing 502 that includes a body 504 with side covers 506 and 508 mounted thereto. The gearbox housing 502 includes a mounting face 510 that is profiled to attach to the mounting face 316, shown in FIG. 3.

Figure 6:
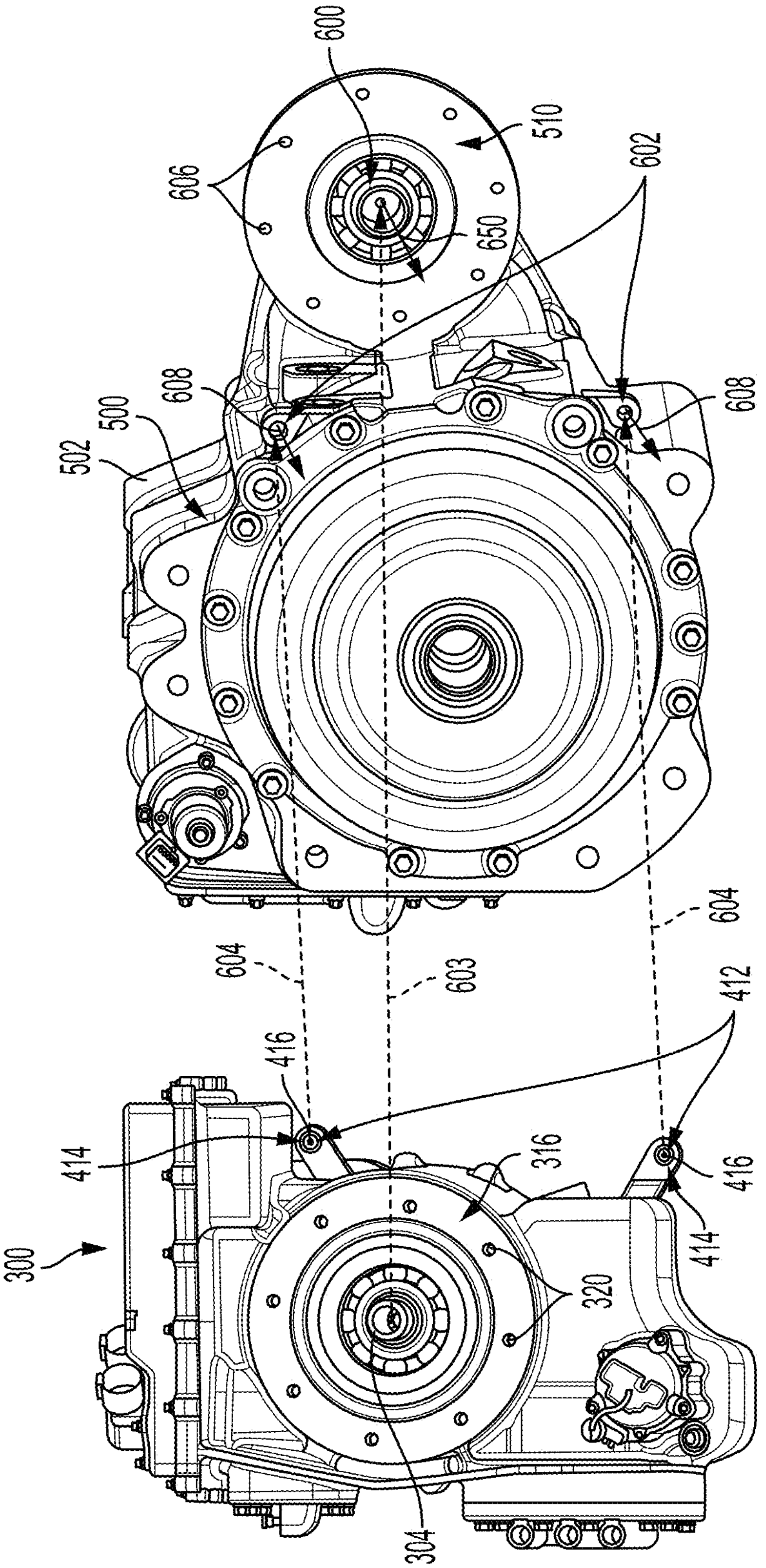

The MPU's output shaft 304, shown in FIG. 3, may be directly rotationally coupled to an input shaft 600 of the gearbox 500, depicted in FIG. 6. As illustrated in FIG. 5, arrows 512 indicate the assembly line of sight for the mounting tabs 412 in the MPU 300, shown in FIG. 4, and mounting holes 602 (e.g., mounting tab holes) in the gearbox housing 502, shown in FIG. 6. Once the MPU is aligned with the gearbox, attachment devices 520 (e.g., bolts, screws, combinations thereof, and the like) are used to removably attach the MPU 300 to the gearbox 500 as indicated via arrows 522, shown in FIG. 5. Arrow 524 indicates the assembly line of sight of the MPU's output shaft and the gearbox's input shaft, discussed in greater detail herein with regard to FIG. 5.

FIG. 6 shows an unfolded view of an assembly process for the MPU 300 and the gearbox 500. The mounting face 316 in the MPU 300 and the mounting face 510 in the gearbox 500 are again depicted. Further, the mounting support tabs 412 in the MPU 300 and the mounting holes 602 in the gearbox housing 502 are again depicted in FIG. 6. Central axes 608 of the mounting holes 602 are indicated in FIG. 6. Central axes 416 of the holes 414 are additionally indicated in FIG. 6.

Arrow 603 indicates the alignment that occurs between the output shaft 304 and the input shaft 600 of the gearbox 500. Rotationally coupling the output shaft 304 and the input shaft 600 brings the mounting face 316 and the mounting face 510 into face sharing contact. Arrows 604 depict the alignment between the support tabs 412 and the mounting holes 602 that occur during the MPU and electric axle assembly.

The holes 414 in the support tabs 412 and the openings 320 in the mounting face 316, may be machined or otherwise manufactured using the same machining set-up to reduce tolerances and increase manufacturing efficiency, as previously discussed.

Figure 7A:
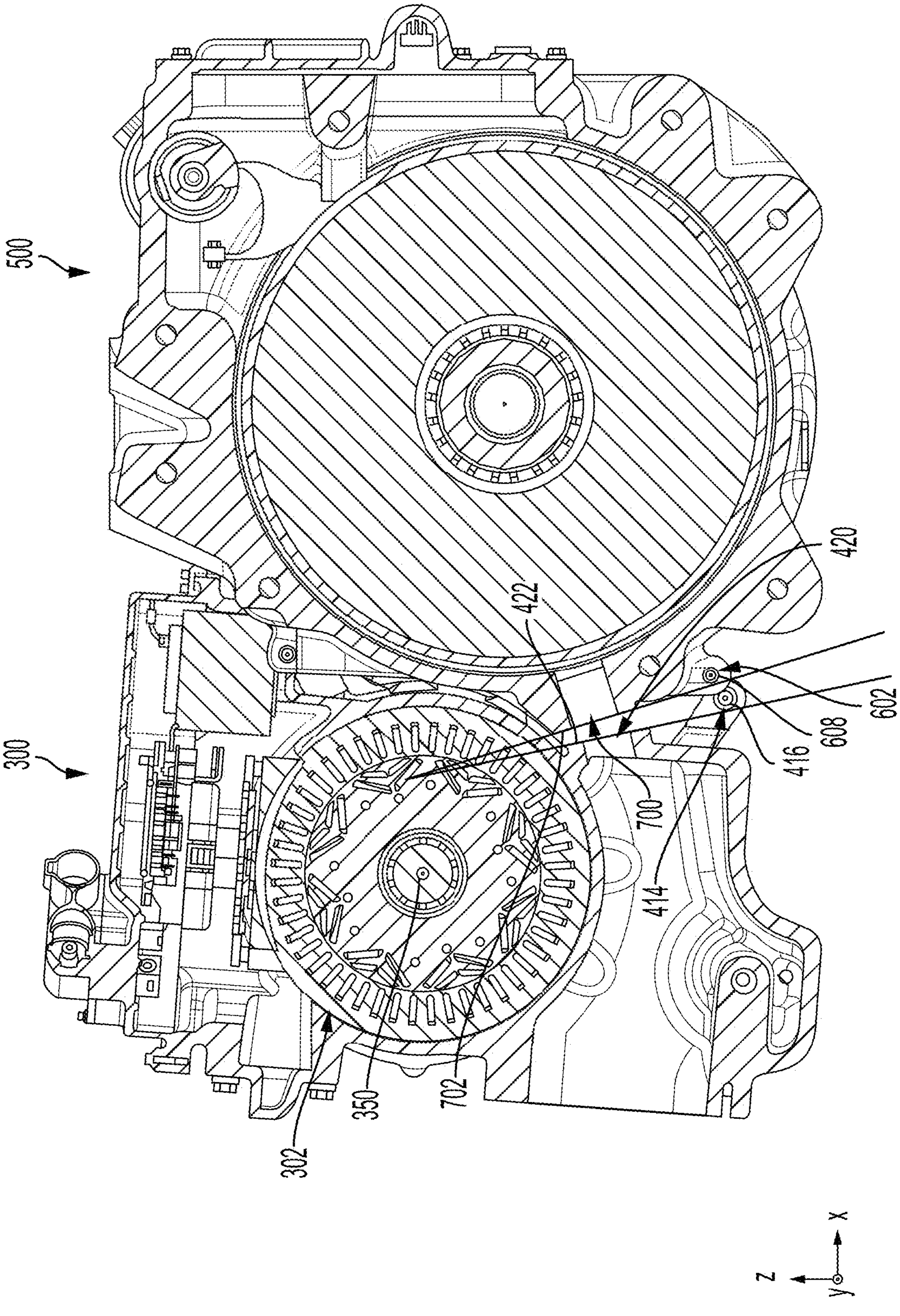
FIGS. 7A-7B show a sequence for aligning attachment holes in the motor power unit and the gearbox, depicted in FIGS. 5-6, in cross-section.
Figure 7B:
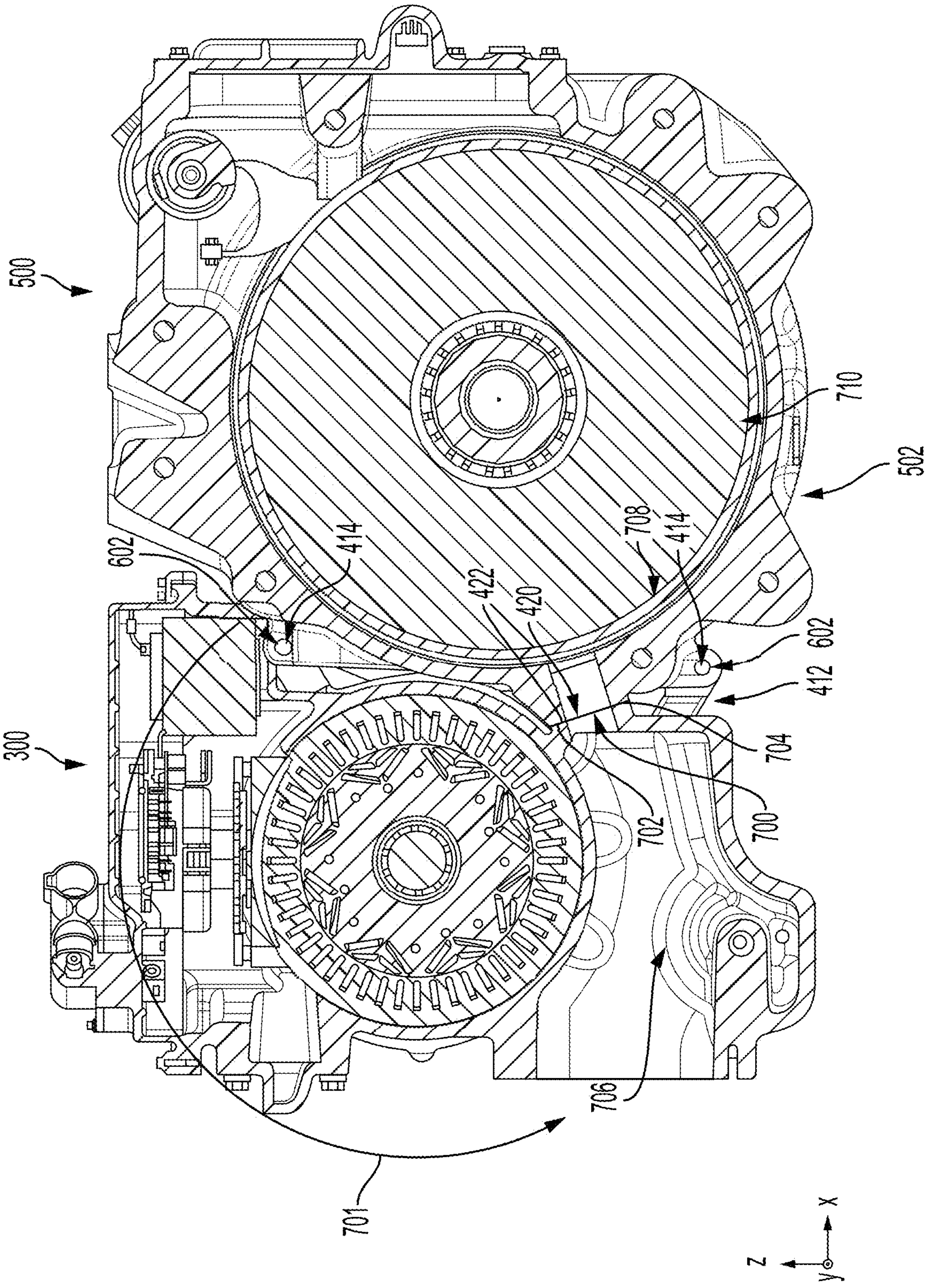

FIGS. 7A-7B show a sequence for aligning the sump return port 420 in the MPU 300 with a sump return port 700 in the gearbox 500. FIGS. 7A-7B are shown in cross-section. The cutting plane for the cross-sectional view depicted in FIGS. 7A-7B extends through the rotational axis 350 of the traction motor 302.

In the attachment sequence shown in FIGS. 7A-7B, the rotational axis 350 of the traction motor 302 and the output shaft 304, correspondingly, is first aligned with a rotational axis 650 of the input shaft 600, shown in FIG. 6. However, as shown in FIG. 7A the central axes 416 of the support tabs 412 and the central axes 608 of the holes 602 in the gearbox 500 are not aligned. To align the support tabs 412 and the gearbox holes 602 the MPU 300 is rotated about the rotational axis 350 until alignment occurs as shown in FIG. 7B and indicated via arrow 701. Once aligned, the sump return port 420 in the MPU 300 is aligned with the sump return port 700 in the gearbox 500. In this way, the flat surface 422 around the sump return port 420 in the MPU 300 is adjacent to a flat surface 702 around the gearbox sump return port 700 in the gearbox 500. As shown in FIG. 7B, a seal 704 (e.g., sealant, a gasket, an O-ring, combinations thereof, and the like) may be arranged between the flat surfaces 422 and 702. After the flat surfaces 422 and 702 are aligned, the MPU 300 and the gearbox 500 may be bolted or otherwise removably attached to one another via attachment devices that extend through the holes 414 in the mounting support tabs 412 and the holes 602 in the gearbox housing 502. In addition, the MPU 300 and the gearbox 500 may be internally bolted together through the MPU sump 706 or a gearbox chamber 708 that may house a mode planetary gear set 710.

It will be understood that when the MPU 300 and the gearbox 500 are drawn together by the sump return bolts, machining tolerances may create motor housing distortions and cause motor pinion misalignment which would affect motor performance, in some cases. Therefore, alternate techniques for attaching the sump ports in the MPU and the gearbox may be used, in other examples. FIGS. 8-13 show alternate techniques for attaching the sump ports in the MPU and the gearbox.

Figure 8:
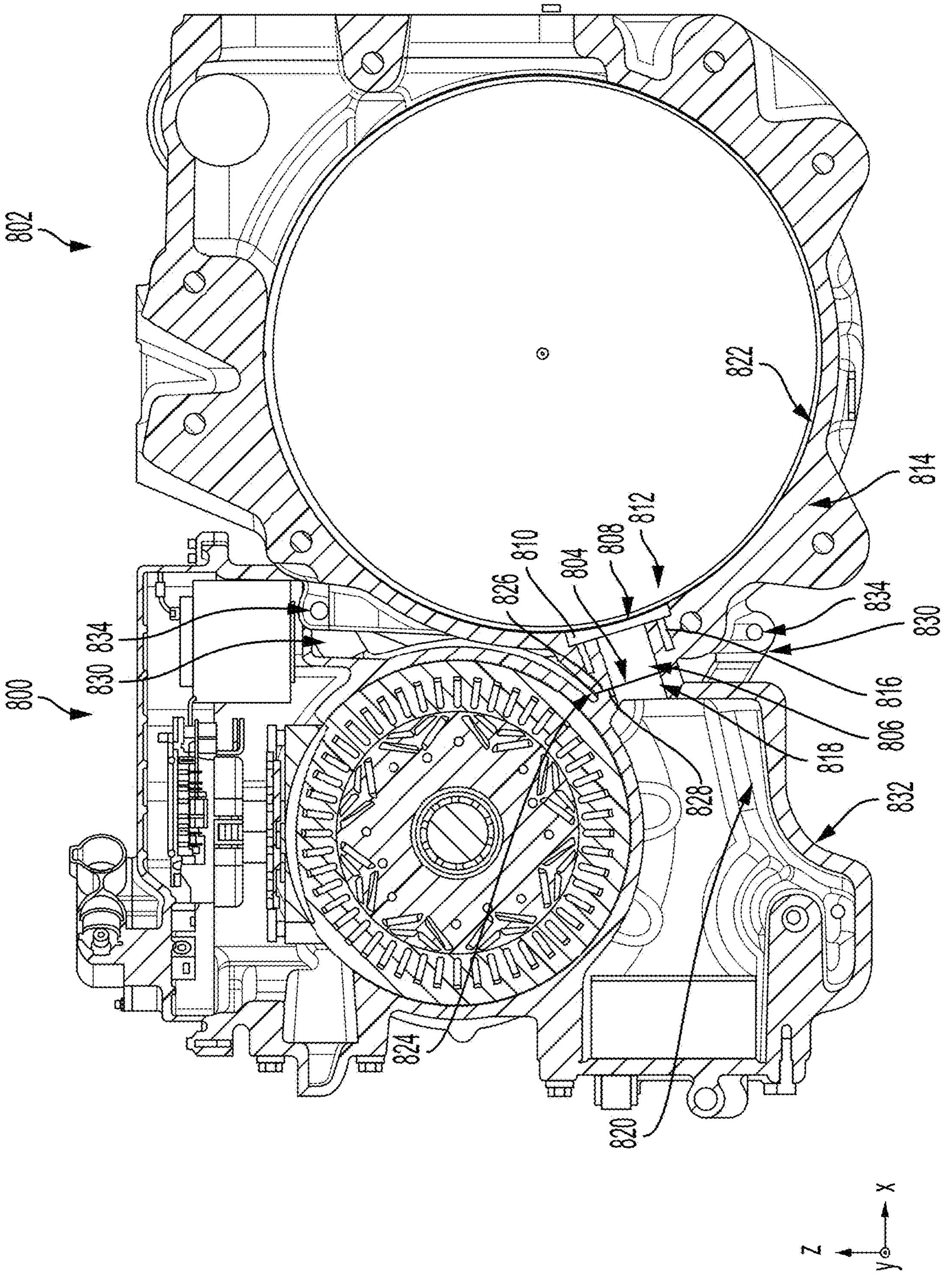
FIG. 8 shows an example of an electric axle with a flanged sleeve in the sump return ports in the motor power unit in the gearbox, in cross-section.

FIG. 8 shows an MPU 800 and a gearbox 802 with a sleeved connection between a sump return port 804 in the MPU and a sump return port 806 in the gearbox. Other than the sleeved connection, the other structural and functional features of the MPU 800 and the gearbox 802 may be similar to structural and the function features of the MPU 300 and the gearbox 500 show in FIGS. 3-7B. Therefore, redundant description of the overlapping features is omitted for concision.

FIG. 8 shows a flanged sleeve 808 that facilitates fluidic connection of the MPU's sump return port 804 and the gearbox's sump return port 806. In the illustrated example, the flanged sleeve 808 includes a flange 810 that is removably coupled to an interior 812 of a gearbox housing 814 via attachment devices 816.

An extension 818 of the flanged sleeve 808 extends through the gearbox sump return port 806 and radially mates with the MPU sump return port 804. In this way, fluidic communication between a sump 820 in the MPU 300 and a sump 822 in the gearbox 802 is established.

A clearance 824 may be formed between a flat surface 826 in the MPU 800 and a flat surface 828 in the gearbox 802 to accommodate for machining tolerances to reduce the chance of the axle's tolerance stack-up from affecting motor performance and component longevity (e.g., bearing longevity). In this way, the adjacent flat surfaces 826 and 828 of both the MPU 800 and the gearbox 802 have a clearance tolerance and do not touch when the electric axle is assembled. Further, as shown in FIG. 8, holes in mounting support tabs 830 in a housing 832 of the MPU 800 are again aligned with holes 834 in the gearbox housing 814. Similar to the other MPU and gearbox electric axle assemblies described herein, attachment devices may be used to attach the MPU to the gearbox using these holes.

Figure 9:
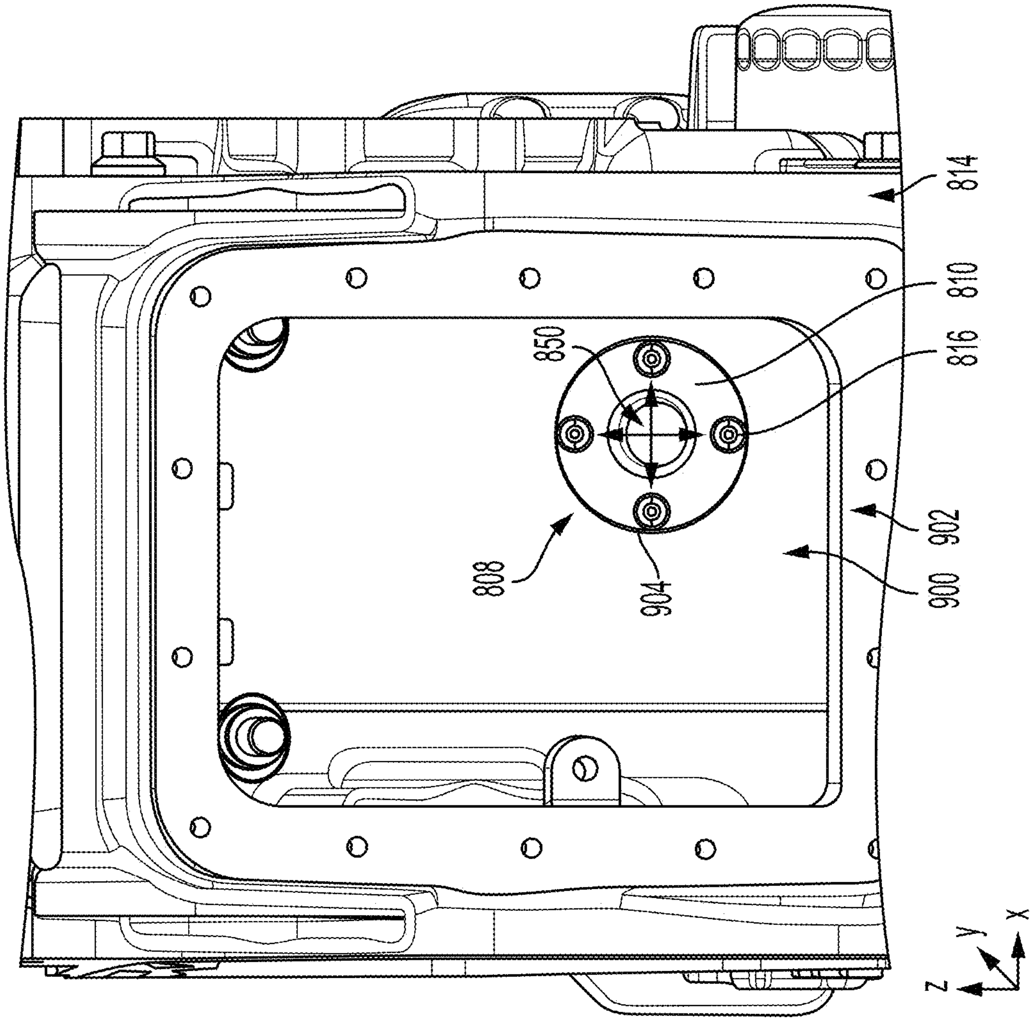
FIG. 9 shows a detailed view of the flanged sleeve, depicted in FIG. 8, in an interior of the gearbox.

FIG. 9 shows a detailed view of an interior gearbox chamber 900 of the gearbox housing 814 where the flange 810 of the flanged sleeve 808 is attached. To expound, a shift fork assembly window 902 in the gearbox housing 814 provides access to the flanged sleeve 808. FIG. 9 shows one flanged sleeve 808 installed, but other MPUs with multiple flanged sleeves 808 have been considered as well.

In one exemplary installation sequence, the flanged sleeve 808 may be installed through the shift fork assembly window 902 in a gearbox chamber 900 that may house a mode planetary gear set. Specifically, the flanged sleeve 808 may first be inserted through the sump return port in the gearbox and then through the sump return port in the MPU. Conversely, in an alternate installation sequence, the flanged sleeve 808 may be assembled through the MPU sump 706 in a similar fashion.

The flange 810 is shown adjacent to a surface 904 of the gearbox housing 814. A face seal discussed in greater detail herein with regard to FIG. 10 may be arranged between the flanged sleeve and the surface 904. The attachment devices

816 (e.g., screws, retaining rings, hold down clamps, combinations thereof, and the like) are again shown attaching the flanged sleeve 808 to the gearbox housing 814.

Figure 10:
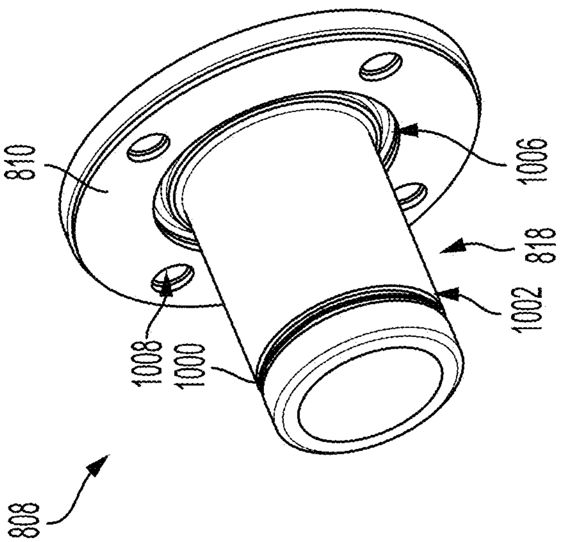
FIG. 10 shows a detailed view of the flanged sleeve, depicted in FIG. 8.

FIG. 10 shows a detailed view of the flanged sleeve 808. The flange 810 and the extension 818 of the flanged sleeve 808 are again illustrated in FIG. 10. In the illustrated example, the flanged sleeve 808 includes an O-ring 1000 mated with an O-ring recess 1002 in the extension 818. It will be understood that the O-ring 1000 seals the sump return port in the MPU.

Further, in the illustrated example, the flanged sleeve 808 includes a face seal 1004 (e.g., a gasket, a face O-ring, and the like). The flanged sleeve 808 may additionally include a relief cut 1006. The flanged sleeve's external radial O-ring 1000 allows for positional tolerance normal to the adjacent flat surfaces 826 and 828 shown in FIG. 8, while the face seal 1004 is allowed to float to absorb positional tolerances in a plane 850 parallel to the adjacent flat surfaces 826 and 828, as shown in FIG. 9. Additionally, clearance openings 1008 in the flange 810, are shown in FIG. 10 for attachment devices 816.

Figure 11:
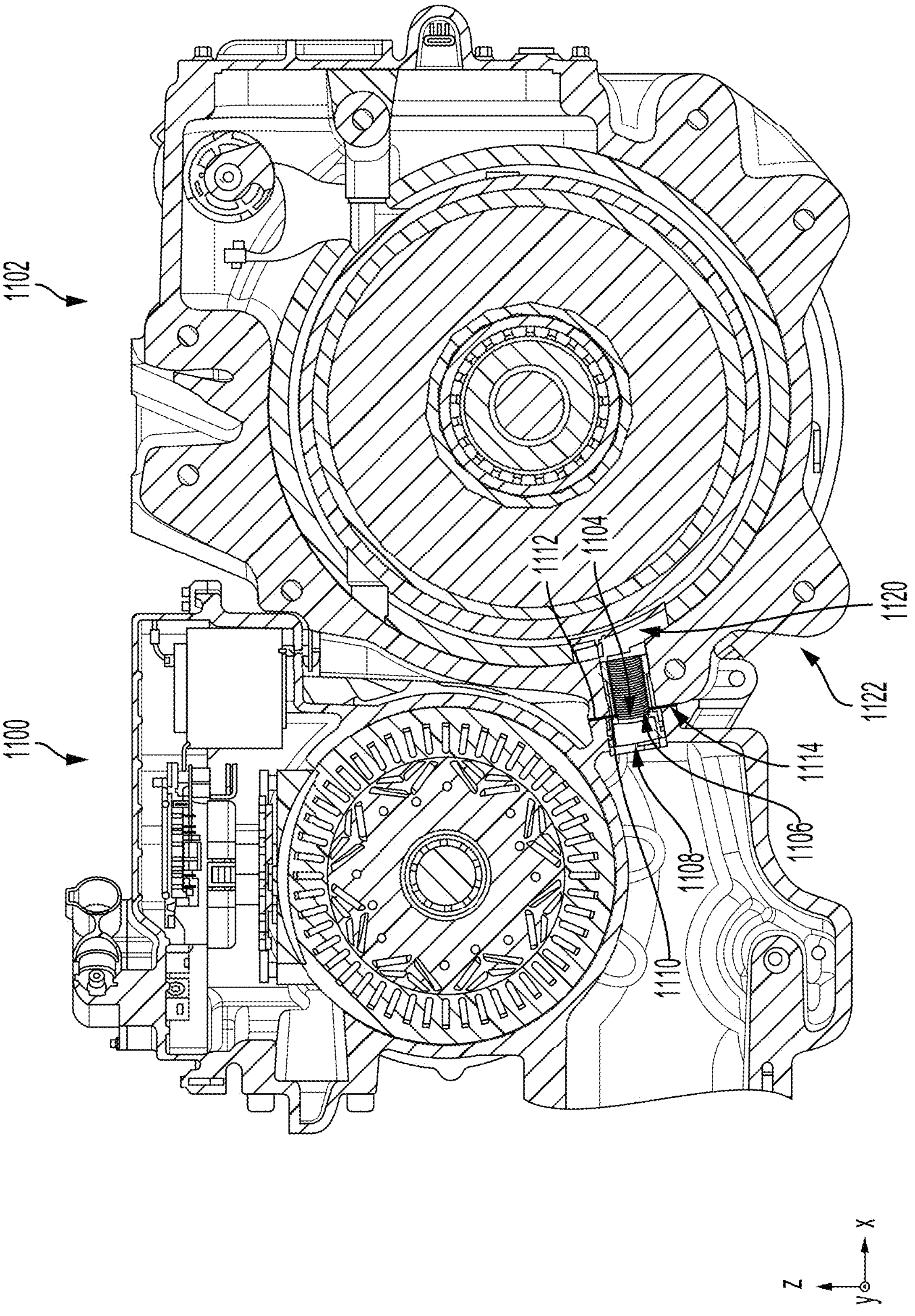
FIG. 11 shows an example of an electric axle with a stepped sleeve in the sump return ports in the motor power unit in the gearbox, in cross-section.

FIG. 11 shows an MPU 1100 and a gearbox 1102 with a stepped sleeved connection between a sump return port 1104 in the MPU and a sump return port 1106 in the gearbox. Specifically, a stepped sleeve 1108 that extends through the sump return ports 1104 and 1106 is shown. However, as discussed in greater detail herein with regard to FIG. 12, multiple stepped sleeves and return ports may be used to fluidly couple the sumps in the MPU and the gearbox.

The stepped sleeve 1108 enables positional tolerance normal to the adjacent flat surfaces 1110 and 1112 in the MPU 1100 and the gearbox 1102, respectively. Further, and radial relief 1304 could provide sleeve misalignment to absorb positional tolerances in the plane of the adjacent flat surfaces. As such, a tolerance clearance 1114 may be allowed between the flat surfaces 1110 and 1112.

Figure 12:
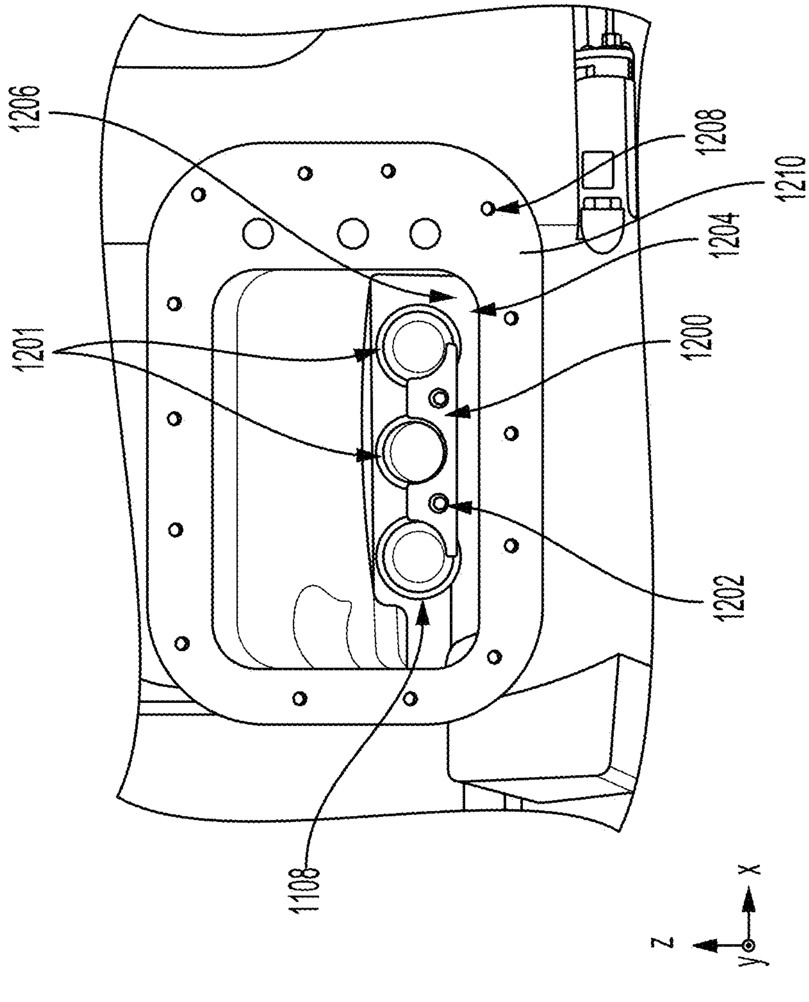
FIG. 12 shows a detailed view of the stepped sleeve, depicted in FIG. 11, in an interior of the motor power unit.

FIG. 12 shows the stepped sleeve 1108 and additional stepped sleeves 1201. These stepped sleeves may have axial float but be retained from falling out with attachment devices 1202 and/or a bracket 1200 as shown in FIG. 12. The attachment devices 1202 may take the form of screws and washers, flanged screws that overhand the edge of the stepped sleeve, retaining rings, and the like. The stepped sleeve 1108 may be installed through a heat exchanger opening 1204 in an MPU sump 1206. Openings 1208 in the periphery 1210 of the heat exchanger opening 1204 allow an access panel to be attached to a housing body of the MPU.

Figure 13:
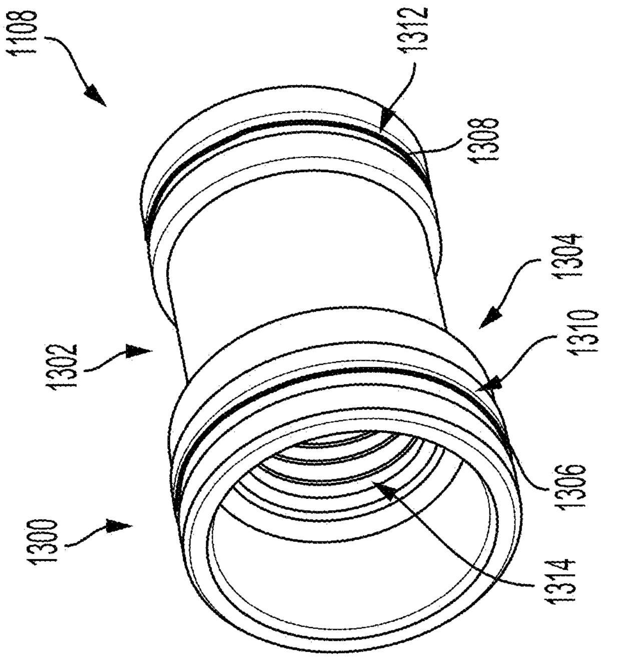
FIG. 13 shows a detailed view of the stepped sleeve, depicted in FIG. 11.

FIG. 13 shows a detailed view of the stepped sleeve 1108 with a larger diameter section 1300 and a smaller diameter section 1302 with a relief 1304 therebetween. O-rings 1306 and 1308 that provide radial sealing may be provided in recesses 1310 and 1312 in both the larger diameter section 1300 and the smaller diameter section 1302 respectively. The stepped sleeve 1108 may include internal threads 1314 that simplify sleeve installation and removal.

Returning to FIG. 11, a baffle 1120 is positioned at an end of the stepped sleeve 1108 in the gearbox housing 1122. The baffle 1120 functions to direct oil into the stepped sleeve 1108, flanged sleeve 808, or sump return port(s) in general.

Figure 14:
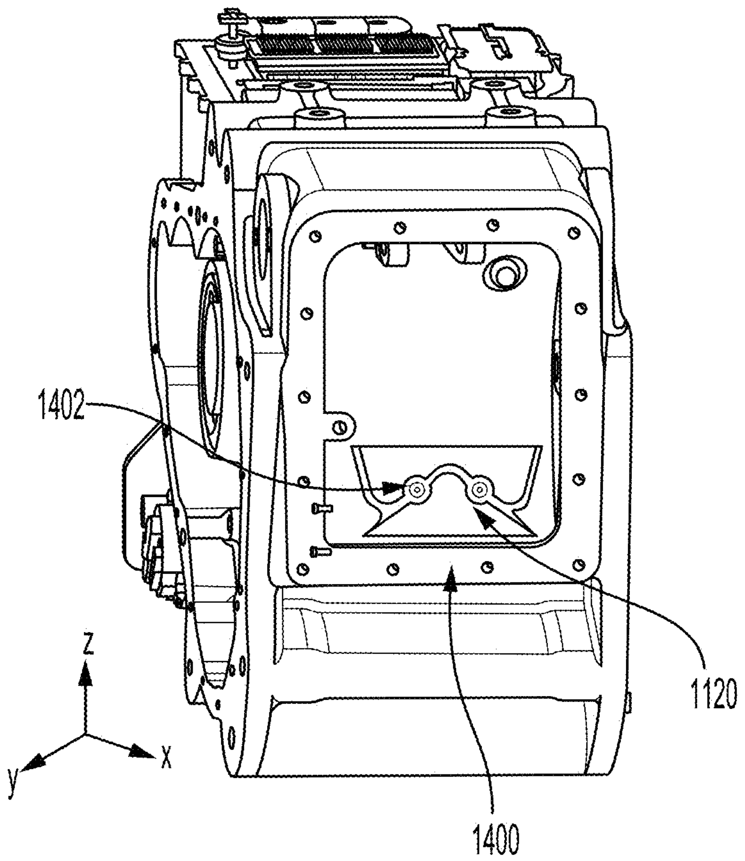
FIG. 14 shows a detailed view of an interior of the gearbox, depicted in FIG. 11, where an oil baffle is attached.

FIG. 14 shows a detailed view of the baffle 1120 and the shift fork window 1400. It will be appreciated that the baffle is configured to be installed through the shift fork window. The baffle 1120 shown in FIG. 14 may specifically be used for a multi-hole sump return. As shown in FIG. 14, the baffle 1120 may be secured in place with attachment devices 1402 such as screws, hold down clamps, or the like. It will be appreciated that the viewable surface of the baffle 1120 shown in FIG. 14 appears flat (except for the two mounting holes).

Figure 15:
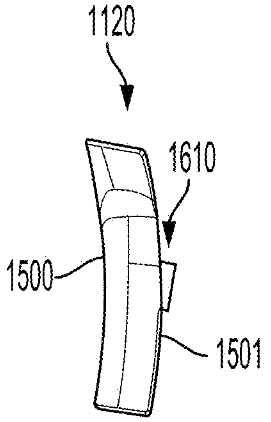
FIGS. 15-16 show detailed views of the oil baffle, depicted in FIG. 14.
Figure 16:
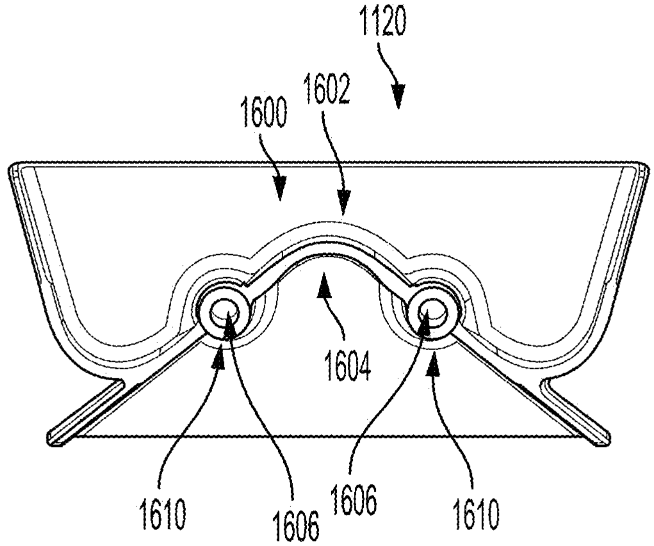

FIGS. 15-16 show a detailed view of the baffle 1120. Specifically, FIG. 15 shows surfaces 1500 and 1501 of the baffle 1120 that are curved to match the contour of the gearbox cavity and rotating parts.

FIG. 16 shows an interior side 1600 of the baffle 1120. Specifically in the illustrated example, the baffle 1120 has a "W" shaped ridge 1602 that functions to channel oil into the outermost return ports for forward drive rotational operation. Further, the baffle 1120 has a "V" shaped ridge 1604 that functions to channel oil into the middle return port for reverse drive rotational operation. In this way, oil may be directed into the MPU when the electric axle is operated in a forward or reverse drive mode with a greater amount of oil being directed in the forward drive mode. The baffle 1120 may be flipped 180 degrees depending on whether the electric axle is installed with the MPU 1100 inboard or outboard of the gearbox 1102. FIG. 16 further shows locating bosses 1610 that would mate with corresponding counterbores in the gearbox housing. Further the locating bosses 1610 have openings 1606 for the attachment devices that attach the baffle to the gearbox housing.

Figure 17:
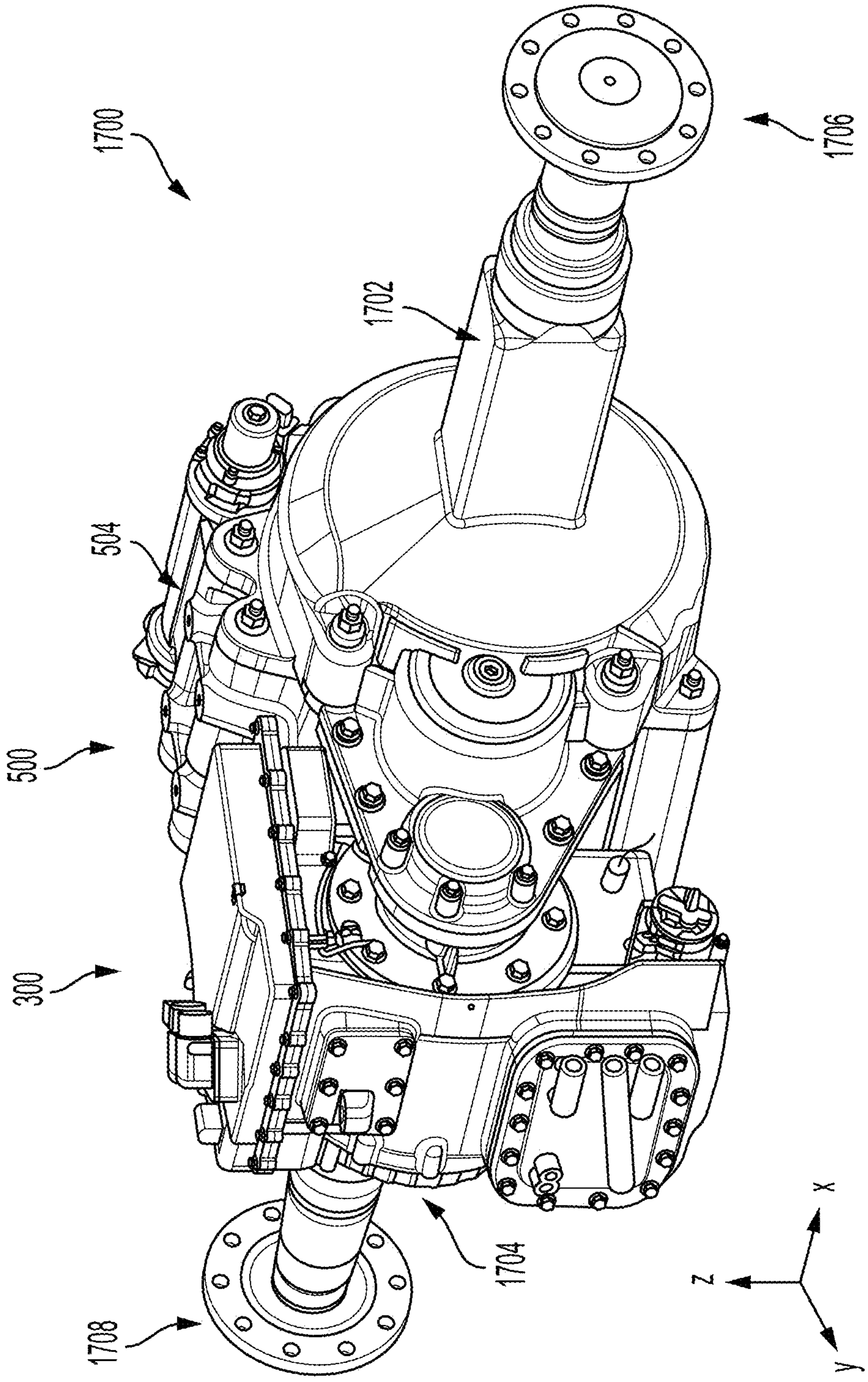
FIGS. 17-18 show detailed views an electric axle with the motor power unit and the gearbox.
Figure 18:
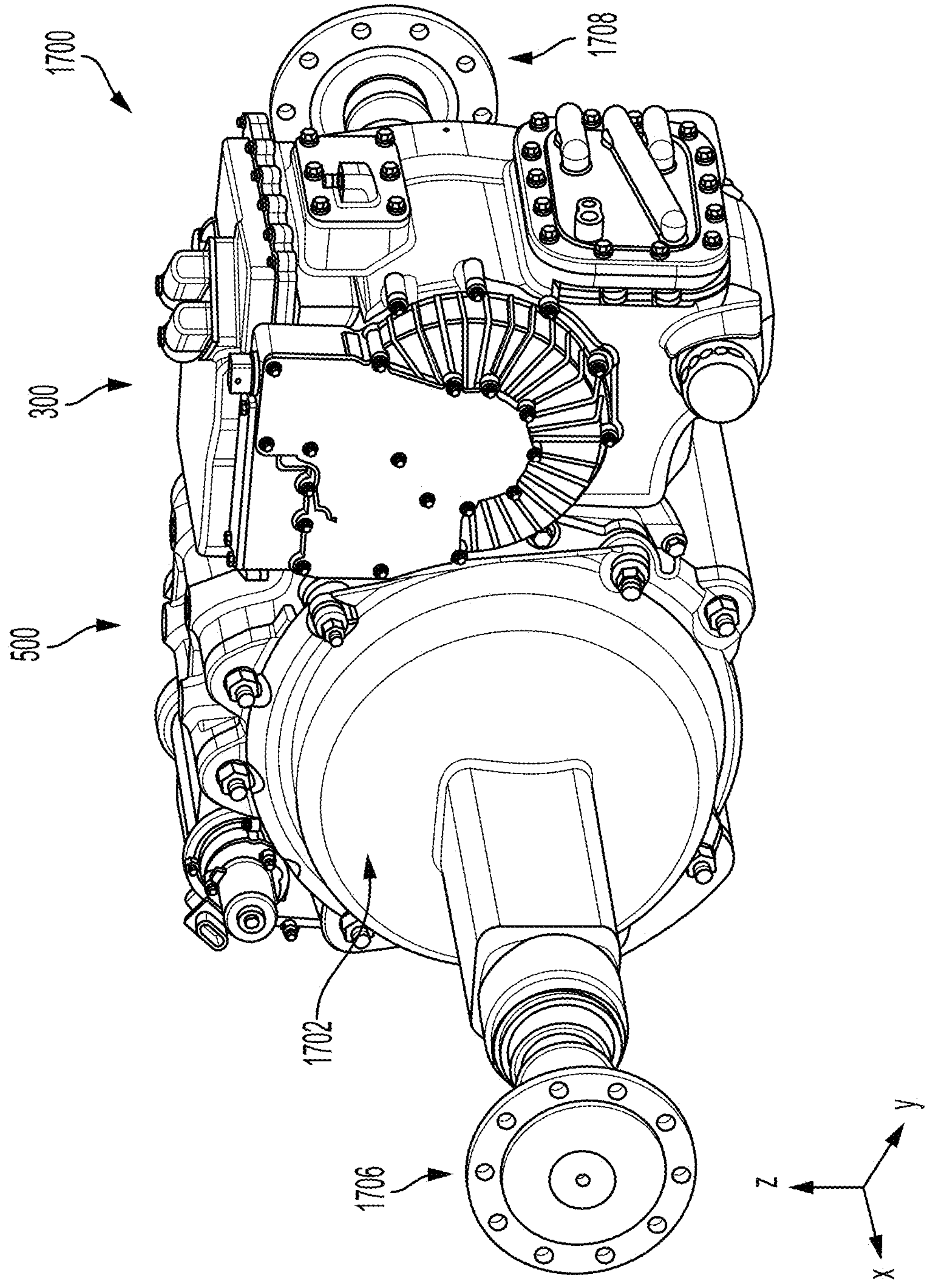

FIGS. 17-18 show different views of an electric axle 1700 in which the MPU 300 and the gearbox 500 are incorporated. It will be understood, that the MPUs 800 or 1100 may be alternatively included in the electric axle 1700 since they have a similar external form factor in relation to the MPU 300 aside from the use of different sump port attachment sleeves that are internal to the MPUs.

As shown in FIGS. 17-18, the MPU 300 is coupled directly to the gearbox 500. Electric axle trumpet arm housing sections 1702 and 1704 are coupled to the gearbox's housing body 504 and enclose axle shafts 1706 and 1708. A differential in the gearbox 500 may be directly rotationally coupled to the axle shafts 1706 and 1708.

The technical effect of the MPUs described herein is to increase manufacturing efficiency of the MPU and the corresponding electric axle in which it may be incorporated.

The invention will be further described in the following paragraphs. In one aspect, a motor power unit is provided that comprises a traction motor including: an output shaft; and a motor face at least partially surrounding the output shaft; a heat exchanger in fluidic communication with a cooling system that is configured to circulate coolant through a hydraulic manifold; and a housing at least partially enclosing the traction motor and the heat exchanger; wherein the housing includes a body with multiple mounting support tabs; wherein the multiple mounting support tabs each include a hole with a central axis that is parallel to a rotational axis of the output shaft; and wherein the motor face is configured to pilot to a gearbox housing in a gearbox via a pilot component. In one example, the pilot component may be a pilot bore and/or one or more locating dowel pins. In another example, the housing may include: a sump return port configured to fluidly attach to a gearbox sump in the gearbox; and a flat surface that is configured to be arranged adjacent to a flat surface in the gearbox housing when the gearbox is attached to the motor power unit. In another example, the motor power unit may further comprise a seal positioned between the flat surface in the motor power unit and the flat surface in the gearbox housing when the gearbox is attached to the motor power unit. In yet another example, the motor power unit may further comprise a flanged sleeve coupled to the sump return port and configured to fluidly couple to the gearbox sump, wherein a flange in the flanged sleeve is configured to removably attach to the gearbox housing. In another example, the motor power unit may further comprise a stepped sleeve coupled to the sump return port and configured to fluidly couple the gearbox sump to a motor power unit sump. In one example, the stepped sleeve may be accessible via a heat exchanger opening in the housing. In yet another example, the motor power unit may further comprise an inverter electrically coupled to the traction motor and at least partially enclosed within the housing. In another example, the cooling system may be configured to circulate coolant through the traction motor.

In another aspect, an electric axle assembly is provided that comprises a gearbox including a gearbox housing; and a motor power unit removably rotationally coupled to the gearbox, wherein the motor power unit comprises: a traction motor with an output shaft and a motor face at least partially surrounding the output shaft; a heat exchanger in fluidic communication with a cooling system that is configured to circulate coolant through a hydraulic manifold; a motor power unit housing at least partially enclosing the traction motor and the heat exchanger; and a sump return port in fluidic communication with a gearbox sump in the gearbox; wherein the housing includes a body that includes multiple mounting support tabs with holes that are configured to axially align with multiple holes in the gearbox housing; wherein the holes in the multiple mounting support tabs each include a central axis that is parallel to the rotational axis of the output shaft; and wherein the motor face pilots to the gearbox housing via a pilot bore or one and/or more locating dowel pins. In one example, the motor power unit housing may include a motor face mating flat surface that is sealingly mated with a flat surface in the gearbox housing via a seal; and central axes of the mounting support tab holes and central axes of the gearbox housing holes are coaxial arranged when the flat surfaces in the motor power unit housing and the gearbox housing are sealingly mated. In another example, the electric axle assembly may further comprise a stepped sleeve coupled to the sump return port and configured to fluidly couple the gearbox sump to a motor power unit sump. In another example, the electric axle assembly may further comprise a baffle configured to direct oil to the sump return port. In yet another example, the baffle may be bi-directional and configured to direct oil into the sump return port when a gearbox component rotates in opposing rotational directions.

In another aspect, a motor power unit for an electric axle assembly is provided that comprises a traction motor with an output shaft and a motor face at least partially surrounding the output shaft; a heat exchanger in fluidic communication with a cooling system that is configured to circulate coolant through a hydraulic manifold; a housing at least partially enclosing the traction motor and the heat exchanger; a sump return port configured to fluidly attach to a gearbox sump in a gearbox; and an inverter electrically coupled to the traction motor and at least partially enclosed within the housing; wherein the housing includes a body with multiple mounting support tabs that are configured to axially align with multiple holes in the gearbox; wherein the multiple mounting support tabs each include a hole with a central axis that is parallel to a rotational axis of the output shaft; and wherein the motor face is configured to pilot to a gearbox housing in a gearbox via a pilot component. In another example, the housing may include: a flat surface that surrounds the sump return port and is configured to be positioned adjacent to a flat surface in the gearbox housing when the gearbox is attached to the motor power unit; and the motor power unit further comprises a seal positioned between the flat surface in the motor power unit and the flat surface in the gearbox housing when the gearbox is attached to the motor power unit. In one example, the motor power unit may further comprise a flanged sleeve coupled to the sump return port and configured to fluidly couple to the gearbox sump, wherein a flange in the flanged sleeve is configured to removably attach to the gearbox housing. In another example, the motor power unit may further comprise a stepped sleeve coupled to the sump return port and configured to fluidly couple the gearbox sump to a motor power unit sump. In yet another example, the inverter may be positioned vertically above the traction motor. In another example, the motor power unit may further comprise an oil pump directly coupled to the housing and in fluidic communication with the heat exchanger. In another example, the motor power unit may further comprise one or more of: an oil filter enclosed within the housing; a hydraulic manifold enclosed within the housing; and a rock guard incorporated into the housing.

FIGS. 3-18 are drawn approximately to scale, aside from the schematically depicted components. However, the components may have other relative dimensions, in alternate embodiments.

FIGS. 1-18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Features described as axial may be approximately parallel with an axis referenced unless otherwise specified. Features described as counter-axial may be approximately perpendicular to the axis referenced unless otherwise specified. Features described as radial may be circumferentially around or extend in a radially outward from an axis, such as the axis referenced, or a component or feature described prior as being radial to a referenced axis, unless otherwise specified.

It will be appreciated that the configurations disclosed herein are exemplary in nature, and that these specific embodiments are not to be considered in a limiting sense, because numerous variations are possible. Moreover, unless explicitly stated to the contrary, the terms “first,” “second,” “third,” and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term “approximately” is construed to mean plus or minus five percent of the range unless otherwise specified.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A motor power unit, comprising:
- a traction motor including:
  - an output shaft; and
  - a motor face at least partially surrounding the output shaft;
- a heat exchanger in fluidic communication with a cooling system that is configured to circulate coolant through a hydraulic manifold; and
- a housing at least partially enclosing the traction motor and the heat exchanger;
- wherein the housing includes a body with multiple mounting support tabs;
- wherein the multiple mounting support tabs each include a hole with a central axis that is parallel to a rotational axis of the output shaft; and
- wherein the motor face is configured to pilot to a gearbox housing in a gearbox via a pilot component.

2. The motor power unit of claim 1, wherein the pilot component is a pilot bore and/or one or more locating dowel pins.

3. The motor power unit of claim 1, wherein the housing includes:
- a sump return port configured to fluidly attach to a gearbox sump in the gearbox; and
- a flat surface that is configured to be arranged adjacent to a flat surface in the gearbox housing when the gearbox is attached to the motor power unit.

4. The motor power unit of claim 3, further comprising a seal positioned between the flat surface in the motor power unit and the flat surface in the gearbox housing when the gearbox is attached to the motor power unit.

5. The motor power unit of claim 3, further comprising a flanged sleeve coupled to the sump return port and configured to fluidly couple to the gearbox sump, wherein a flange in the flanged sleeve is configured to removably attach to the gearbox housing.

6. The motor power unit of claim 3, further comprising a stepped sleeve coupled to the sump return port and configured to fluidly couple the gearbox sump to a motor power unit sump.

7. The motor power unit of claim 6, wherein the stepped sleeve is accessible via a heat exchanger opening in the housing.

8. The motor power unit of claim 1, further comprising an inverter electrically coupled to the traction motor and at least partially enclosed within the housing.

9. The motor power unit of claim 1, wherein the cooling system is configured to circulate coolant through the traction motor.

10. An electric axle assembly, comprising:

a gearbox including a gearbox housing; and a motor power unit removably rotationally coupled to the gearbox, wherein the motor power unit comprises:

a traction motor with an output shaft and a motor face at least partially surrounding the output shaft;

a heat exchanger in fluidic communication with a cooling system that is configured to circulate coolant through a hydraulic manifold;

a motor power unit housing at least partially enclosing the traction motor and the heat exchanger; and a sump return port in fluidic communication with a gearbox sump in the gearbox;

wherein the housing includes a body that includes multiple mounting support tabs with holes that are configured to axially align with multiple holes in the gearbox housing;

wherein the holes in the multiple mounting support tabs each include a central axis that is parallel to the rotational axis of the output shaft; and wherein the motor face pilots to the gearbox housing via a pilot bore or one and/or more locating dowel pins.

11. The electric axle assembly of claim 10, wherein:

the motor power unit housing includes a motor face mating flat surface that is sealingly mated with a flat surface in the gearbox housing via a seal; and central axes of the mounting support tab holes and central axes of the gearbox housing holes are coaxial arranged when the flat surfaces in the motor power unit housing and the gearbox housing are sealingly mated.

12. The electric axle assembly of claim 10, further comprising a stepped sleeve coupled to the sump return port and configured to fluidly couple the gearbox sump to a motor power unit sump.

13. The electric axle assembly of claim 10, further comprising a baffle configured to direct oil to the sump return port.

14. The electric axle assembly of claim 13, wherein the baffle is bi-directional and configured to direct oil into the sump return port when a gearbox component rotates in opposing rotational directions.

15. A motor power unit for an electric axle assembly, comprising:

a traction motor with an output shaft and a motor face at least partially surrounding the output shaft;

a heat exchanger in fluidic communication with a cooling system that is configured to circulate coolant through a hydraulic manifold;

a housing at least partially enclosing the traction motor and the heat exchanger;

a sump return port configured to fluidly attach to a gearbox sump in a gearbox; and an inverter electrically coupled to the traction motor and at least partially enclosed within the housing;

wherein the housing includes a body with multiple mounting support tabs that are configured to axially align with multiple holes in the gearbox;

wherein the multiple mounting support tabs each include a hole with a central axis that is parallel to a rotational axis of the output shaft; and wherein the motor face is configured to pilot to a gearbox housing in a gearbox via a pilot component.

16. The motor power unit of claim 15, wherein the housing includes:

a flat surface that surrounds the sump return port and is configured to be positioned adjacent to a flat surface in the gearbox housing when the gearbox is attached to the motor power unit; and the motor power unit further comprises a seal positioned between the flat surface in the motor power unit and the flat surface in the gearbox housing when the gearbox is attached to the motor power unit.

17. The motor power unit of claim 15, further comprising a flanged sleeve coupled to the sump return port and configured to fluidly couple to the gearbox sump, wherein a flange in the flanged sleeve is configured to removably attach to the gearbox housing.

18. The motor power unit of claim 15, further comprising a stepped sleeve coupled to the sump return port and configured to fluidly couple the gearbox sump to a motor power unit sump.

19. The motor power unit of claim 15, further comprising one or more of:

an oil filter coupled to or at least partially enclosed within the housing;

a hydraulic manifold enclosed within the housing; and a rock guard incorporated into the housing.

20. The motor power unit of claim 15, further comprising an oil pump directly coupled to the housing and in fluidic communication with the heat exchanger.

* * * * *